No. 817,636. PATENTED APR. 10, 1906.
P. J. GARRISON.
CAR WHEEL.
APPLICATION FILED SEPT. 13, 1905.

Witnesses

Inventor
Perry J. Garrison,
by Knight Bros
Attorneys.

UNITED STATES PATENT OFFICE.

PERRY J. GARRISON, OF THREE RIVERS, MICHIGAN.

CAR-WHEEL.

No. 817,636.  Specification of Letters Patent.  Patented April 10, 1906.

Application filed September 13, 1905. Serial No. 278,266.

*To all whom it may concern:*

Be it known that I, PERRY J. GARRISON, a citizen of the United States, residing at Three Rivers, in the county of St. Joseph, State of Michigan, have invented certain new and useful Improvements in the Manufacture of Railway-Car Wheels, of which the following is a specification.

My invention relates to the manufacture of car-wheels from sheet-steel by the process of forging and pressing together the parts.

The invention has for its objects to produce a wheel of simple construction that will be of sufficient strength to permit its use in the heaviest railway traffic, also to produce a wheel that is not dependent upon bolt or rivet connections to hold its parts together, and which is therefore free from destruction by the unscrewing of bolts or the breaking of rivets.

In carrying out my invention I make a wheel comprising but two members, each having integral rim, web, and hub portions and fitted together under considerable pressure, with the rim portions telescoping in such relation as to become permanently united to form a rigid tread, with a flange-forming part on the outer rim portion folded into abutment with the inner rim portion to further interlock the parts and support the flange, with the web portions extending inwardly from opposite edges of the tread depressed into abutment intermediate of the rim and hub, where for securing further stiffness they may be united by rivets and then spread apart again to the outer ends of the hub, and with the integral hub portions projecting inwardly into abutment and providing the bore to receive the axle upon which the wheel is pressed. A thimble or sleeve surrounds the hub thus formed, extending into abutment with the web members and sustaining the hub members when forced over the axle.

My invention will be fully understood upon reference to the accompanying drawings, in which—

Figure 1:
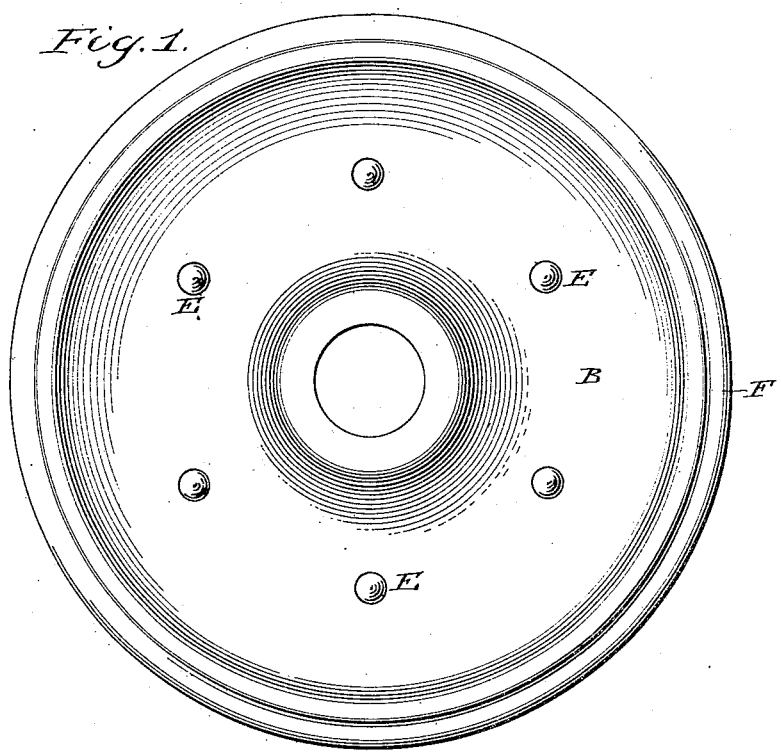
Figure 2:
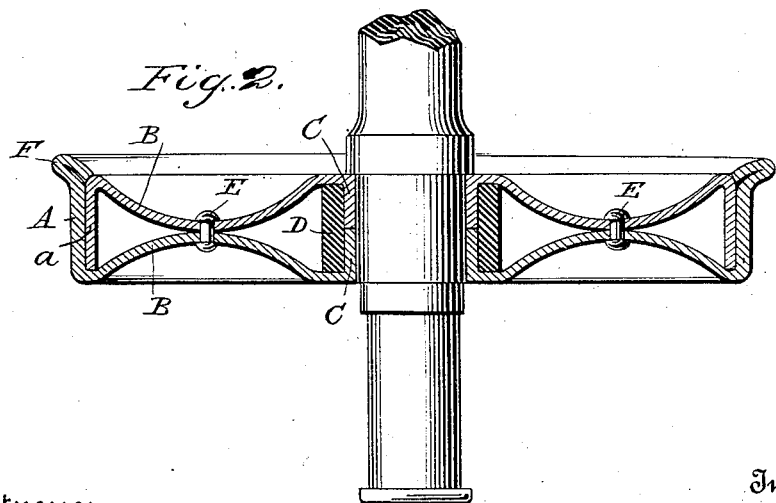

Figure 1 is a face view of a wheel constructed in accordance with my invention, and Fig. 2 is an axial section of the wheel applied to a standard car-axle.

The wheel is made of two members comprising outer and inner rim portions A a, web portions B, extending radially inward from opposite edges of the rim portions and depressed into abutment intermediate of the rim and hub and again separated to meet the outer ends of the hub, and hub portions C, extending in the direction of the wheel's axis inward from the respective web portions and abutting in the central plane of the wheel to form a hub and provide bore-bearing to receive the axle. The bore thus formed is of such dimension as to be fitted snugly over the reduced end of the axle requiring considerable pressure to force it to its seat. To sustain the hub under this pressure and to stiffen the connection between the hub portion and the web portion, a thimble or sleeve D is introduced around the hub and in abutment with the web portions adjacent thereto. The internal diameter of the thimble D is the same or less than the external diameter of the parts that are forced within it, so that the parts are strained within the limits of their elasticity as they are forced together, and there is secure and permanent binding between them. The web portions may be tied together in the annular line of their abutment by rivets E, which will assist in stiffening the structure, though such rivets are by no means necessary to hold the members of the wheel together, and their breaking out would not cause serious consequences if replaced within a reasonable time. The rim portions A a are forced together under considerable pressure, being of such relative diameters as to put the external rim portion under strains of tension and the internal rim portion under strains of compression, thus causing the parts to bind together against any possibility of slipping apart, even though the rivets E were not used or should become broken in use. The parts are equally tied together at the hub by the binding of the thimble D upon the hub portions and their binding in turn upon the axle. To further interlock the outer portions of the wheel, the part A is provided with a flange member F, integral therewith and bent around until it abuts against the shoulder between the parts a and B. This not only greatly stiffens the flange of the wheel, but it acts as a further safeguard against removal of the inner member of the wheel. In practice I prefer to make the rim member A somewhat thicker than the inner member a, as by so doing I not only increase the life of the wheel by providing more metal to receive the wear, but I obtain a better tread for the wheel. With these relations of the dimensions of the parts a and A the inner member a is left under greater strains than the outer member when the parts are forced together and the tread is in better condition to withstand external loads.

With a wheel constructed as above described I have provided a sheet-metal wheel with integral parts extending from the axle to the rail, with bolts or rivets as a means of sustaining the load placed upon the wheel entirely eliminated, with both edges of the tread equally sustained in a radial direction, with the wheel well braced against the thrust incident to striking curves on the rails, with a total elimination of the easily-broken flange in the cast wheel, and with the sustaining parts of the wheel substantially reduced to two in number and these of solid structure free from weakening angles and united in a manner to prevent loosening or separation by vibration.

Having thus described my invention, what I claim, and desire to secure by Letters Patent, is—

1. In a car-wheel, the combination of two opposing members each having integral web and hub portions, the hub portions forming the bore or bearing for the axle, and a thimble surrounding the hub portions of both members.

2. A car-wheel comprising two opposing members, each having integral rim, web and hub portions, the web portions abutting and tied together intermediate the rim and the hub.

3. As a new article of manufacture, a car-wheel comprising two parts telescoping at their circumference to form the tread and abutting at their inner edges so as to form an axle-bearing.

4. In a car-wheel the combination of two opposing members, each having integral rim, web and hub portions, the rim portions being telescoped into binding relation, the hub portions being brought into abutment to form a hub and united by a surrounding thimble into which they are forced under pressure.

5. In a car-wheel the combination of two opposing members, each having integral rim, web and hub portions, the rim portions being telescoped into binding relation, the hub portions being brought into abutment to form a hub and united by a surrounding thimble into which they are forced under pressure; the web portions being also brought into abutment and tied together at points in an annulus intermediate the rim and the hub.

6. A metallic wheel comprising two members each constructed with integral rim, web and hub portions, the rim portions being telescoped into permanent binding relation to form a wheel-tread, the web portions extending radially inward from opposite edges of the tread thus formed, depressed into abutment and tied together intermediate of the rim and hub, and then spaced apart to meet the ends of the hub, and the hub portions extending inwardly from the web portions and brought into abutment, and tied together by a surrounding thimble into which they are forced.

The foregoing specification signed at Washington, District of Columbia, this 7th day of September, 1905.

PERRY J. GARRISON.

In presence of—
HERVEY S. KNIGHT,
EDWIN S. CLARKSON.